(12) United States Patent
Ryoo et al.

(10) Patent No.: US 12,479,281 B2
(45) Date of Patent: Nov. 25, 2025

(54) VEHICLE DRIVE APPARATUS

(71) Applicant: TOYOTA JIDOSHA KABUSHIKI KAISHA, Toyota (JP)

(72) Inventors: Yongjoo Ryoo, Sunto-gun (JP); Naoki Marukawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 18/449,837

(22) Filed: Aug. 15, 2023

(65) Prior Publication Data

US 2024/0123805 A1    Apr. 18, 2024

(30) Foreign Application Priority Data

Oct. 12, 2022   (JP) .................................. 2022-163778

(51) Int. Cl.
*B60K 1/00*    (2006.01)
(52) U.S. Cl.
CPC ...................... *B60K 1/00* (2013.01)
(58) Field of Classification Search
CPC ....................................................... B60K 1/00
See application file for complete search history.

(56) References Cited

U.S. PATENT DOCUMENTS

| | | | |
|---|---|---|---|
| 9,718,356 B1* | 8/2017 | Ikeda | B60K 17/16 |
| 2018/0178641 A1* | 6/2018 | Yamafuji | H01M 8/247 |
| 2021/0257889 A1* | 8/2021 | Marukawa | H02K 5/10 |
| 2024/0116345 A1* | 4/2024 | Itoh | B60R 16/0207 |
| 2024/0123805 A1* | 4/2024 | Ryoo | B60K 1/00 |
| 2025/0018783 A1* | 1/2025 | Kwon | B60K 6/405 |

FOREIGN PATENT DOCUMENTS

| | | |
|---|---|---|
| JP | H08-310252 A | 11/1996 |
| JP | 2020-092503 A | 6/2020 |

* cited by examiner

*Primary Examiner* — Erez Gurari
(74) *Attorney, Agent, or Firm* — Oliff PLC

(57) ABSTRACT

A vehicle drive apparatus includes: a case accommodating a rotating electric machine; a mount supporting the case to a vehicle body; and a power control unit controlling the rotary electric machine. Further, the mount includes a bracket which is fixed to the vehicle body, a mount member which is fixed to the case, and an elastic member provided between the bracket and the mount member, the power control unit is fixed to the mount member, the mount member has a horizontal surface on a top thereof as a mounting surface on which the power control unit is attached, and the power control unit and the case are integrated via the mount member.

5 Claims, 6 Drawing Sheets

VEHICLE DRIVE APPARATUS

CROSS-REFERENCE TO RELATED APPLICATION (S)

The present application claims priority to and incorporates by reference the entire contents of Japanese Patent Application No. 2022-163778 filed in Japan on Oct. 12, 2022.

BACKGROUND

The present disclosure relates to a vehicle drive apparatus.

Japanese Laid-open Patent Publication No. 2020-092503 discloses a drive device mounted on an electric vehicle, a configuration in which a power control unit is mounted on the top of the case housing the rotating electric machine and the transaxle.

SUMMARY

There is a need for providing a vehicle drive apparatus capable of integrating the power control unit without considering the posture of the internal components.

According to an embodiment, a vehicle drive apparatus includes: a case accommodating a rotating electric machine; a mount supporting the case to a vehicle body; and a power control unit controlling the rotary electric machine. Further, the mount includes a bracket which is fixed to the vehicle body, a mount member which is fixed to the case, and an elastic member provided between the bracket and the mount member, the power control unit is fixed to the mount member, the mount member has a horizontal surface on a top thereof as a mounting surface on which the power control unit is attached, and the power control unit and the case are integrated via the mount member.

DETAILED DESCRIPTION

In the related art, in the configuration described in Japanese Laid-open Patent Publication No. 2020-092503, although the power control unit is mounted on the outer peripheral wall portion of the case accommodating the rotary electric machine, the outer peripheral wall portion is inclined. Therefore, it is necessary to integrate the power control unit into the case in consideration of the posture of the internal components.

Hereinafter, with reference to the drawings, a specific description will be given of a vehicle drive apparatus according to an embodiment of the present disclosure. Note that the present disclosure is not limited to the embodiments described below.

Figure 1:
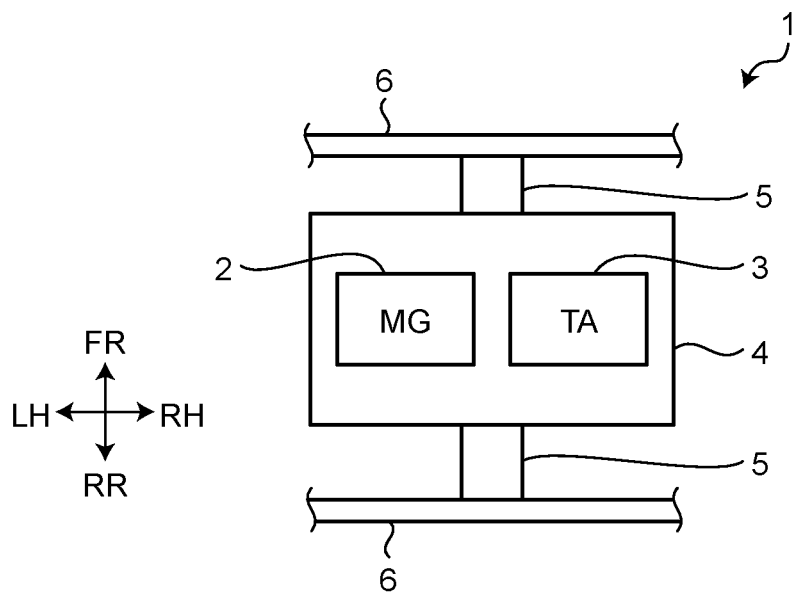
FIG. 1 is a drawing schematically illustrating a driving apparatus according to an embodiment.

FIG. 1 is a diagram schematically showing a drive device in the embodiment. Drive device 1 is a vehicle drive apparatus mounted on an electric vehicle.

The driving device 1 is configured to include a rotating electric machine (MG) 2 and a transaxle (TA) 3.

The rotating electric machine 2 is a power source of an electric vehicle, and functions as an electric motor and a generator. Transaxle 3 transmits the power output from the rotating electric machine 2 to the drive wheels. The rotating electric machine 2 and the transaxle 3 are housed inside the case 4. The case 4 is a transaxle case for accommodating the rotating electric machine 2 and the transaxle 3 therein.

For example, the drive unit 1 is mounted on the rear of the platform of the electric vehicle. The rear of the platform has a smaller installation space (allowance space) than the front of the platform. Therefore, when the driving device 1 is mounted on the rear of the platform, since the rotary electric machine 2 becomes small, the body size of the case 4 also becomes small.

The case 4 is supported by the vehicle body 6 through the mount 5. The mount 5 is a MG mount for supporting the rotary electric machine 2 to the vehicle body 6, a TA mount for supporting the transaxle 3 to the vehicle body 6. The mount 5, in the longitudinal direction of the electric vehicle includes a mount 7 attached to the front of the case 4, and a mount 8 attached to the rear of the case 4. The mount 7 is a front mount (FR mount), the mount 8 is a rear mount (RR mount).

Figure 2:
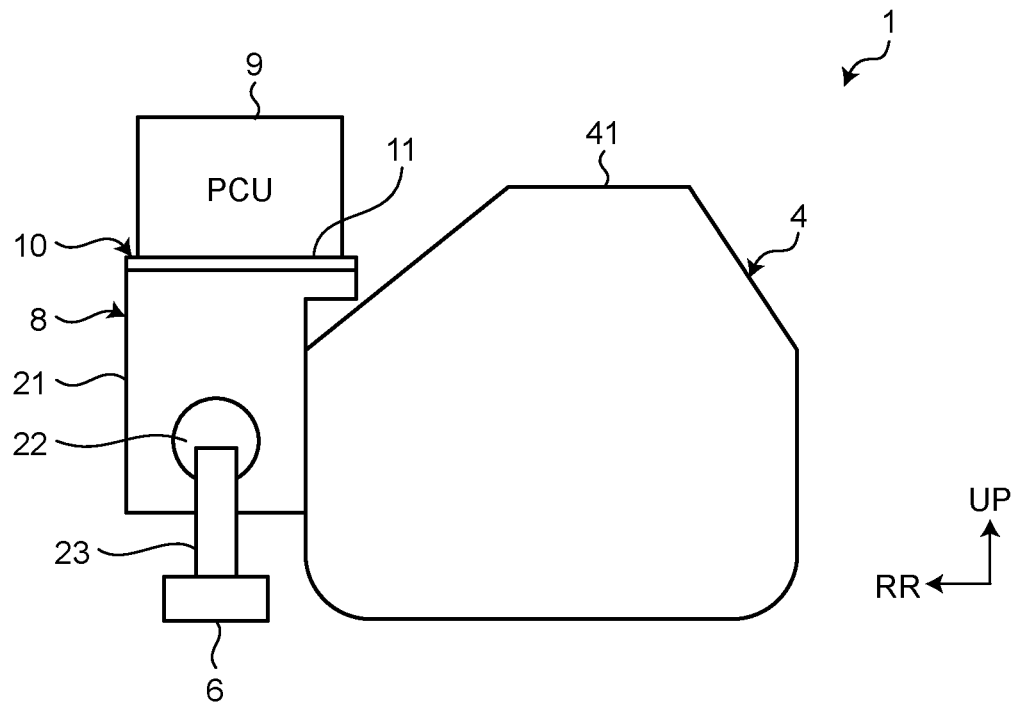
FIG. 2 is a drawing illustrating an arrangement of a power control unit.

Further, in the driving device 1, as illustrated in FIG. 2, the power control unit (PCU) 9 is attached to the mount 8. Incidentally, the mount 7 is omitted in the figure.

The power control unit 9, the inner component is fixed to the mount 8 in a condition of being accommodated in PCU case. The power control unit 9 controls the rotary electric machine 2. The power control unit 9 is electrically connected to the rotary electric machine 2. For example, the power control unit 9 and the rotary electric machine 2 via an electric cable provided between the case 4 and PCU case is electrically connected.

Figure 3:
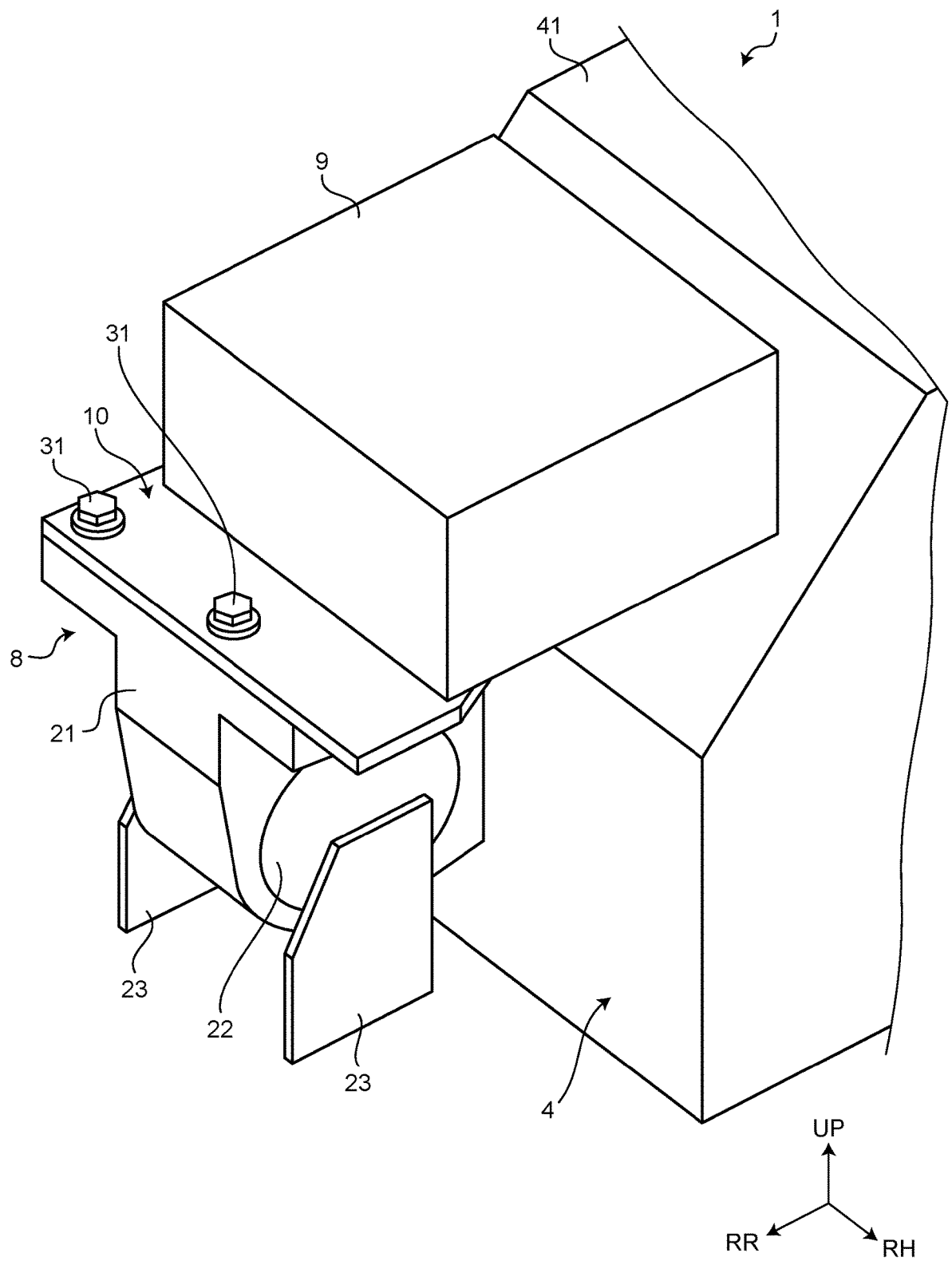
FIG. 3 is a perspective view for explaining the drive device.

Further, as illustrated in FIGS. 2 and 3, the mounting bracket 10 is interposed between the power control unit 9 and the mount 8. The power control unit 9 is fixed to the mount 8 via a mounting bracket 10. The mount 8 supports the case 4 and the power control unit 9 to the vehicle body 6. The mount 8 has a mount member 21, an elastic member 22, and a bracket 23.

The mount member 21 is a member which is fixed to the power control unit 9. In the drive unit 1, the power control unit 9 and the case 4 are integrated through the mount member 21. The mount member 21 is a metal member. The power control unit 9 is fixed via a mounting bracket 10 to the mount member 21. As illustrated in FIG. 3, the mounting bracket 10 is fastened to the mount member 21 by bolts 31. For example, after fixing the mounting bracket 10 to the case of the power control unit 9 (PCU case), bolting the mounting bracket 10 on the upper surface of the mount 8.

Figure 4:
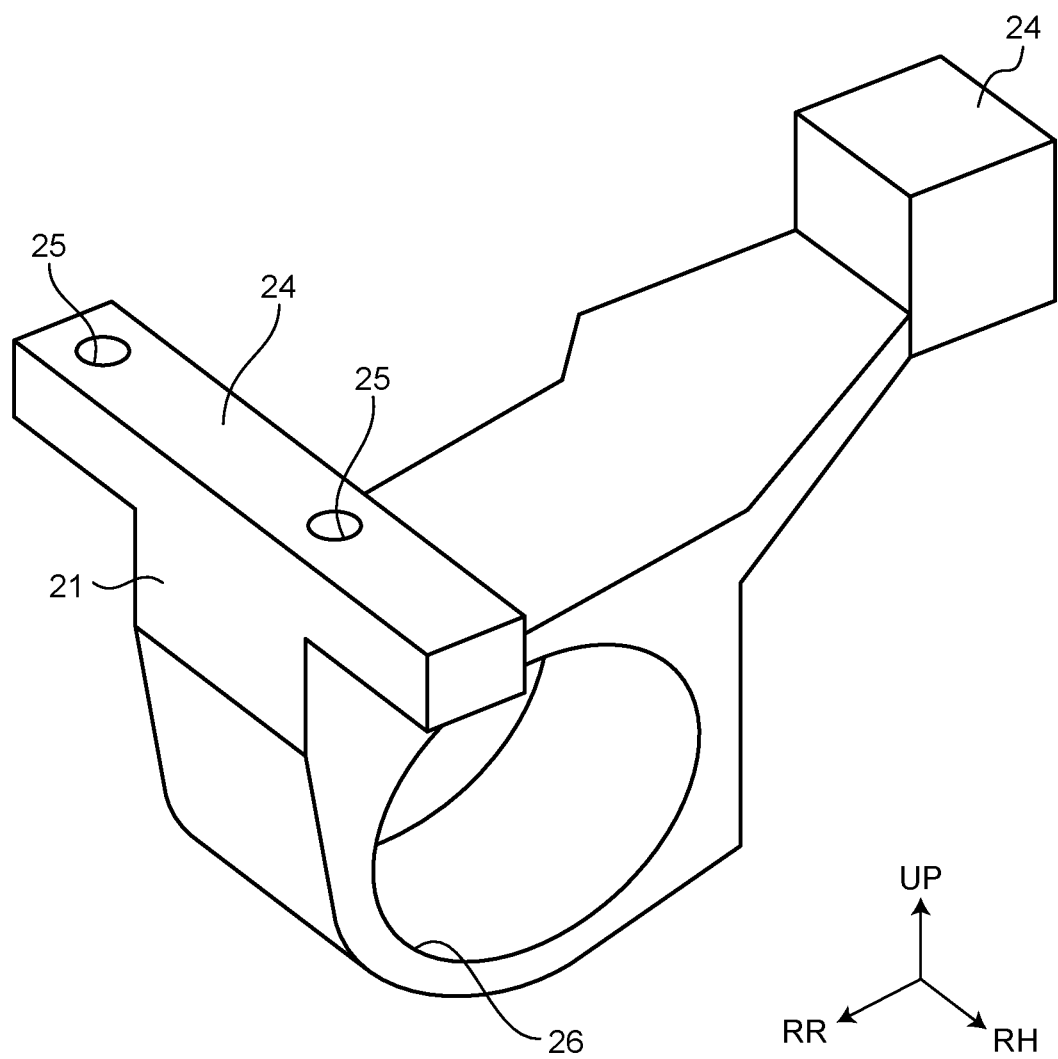
FIG. 4 is a perspective view illustrating a mount member.
Figure 5:
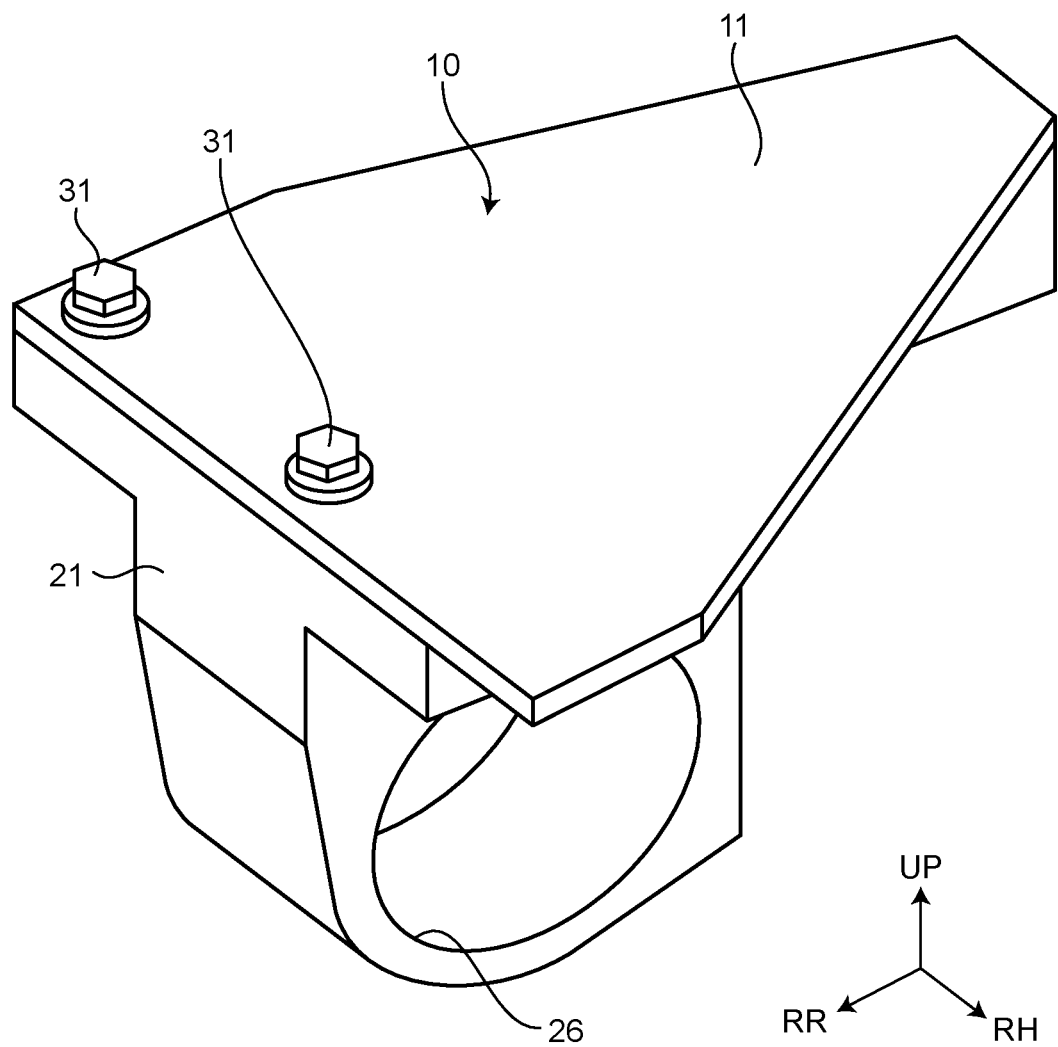
FIG. 5 is a perspective view for explaining a mounting bracket.

Specifically, the mount member 21, as illustrated in FIG. 4, as a mounting surface to which the power control unit 9 is attached, has a horizontal surface 24 on the upper. The horizontal surface 24 includes a surface located above the case 4, and a surface located behind the case 4. The horizontal surface 24, the bolt hole 25 bolt 31 is screwed is provided. A bolt 31 is inserted through the through hole provided in the mounting bracket 10, screwed into the bolt hole 25 provided in the mount member 21. In a state where the power control unit 9 is fixed to the mount member 21 together with the mounting bracket 10, the upper surface 11 of the mounting bracket 10 is in contact with the power control unit 9, the lower surface of the mounting bracket 10 is in contact with the horizontal surface 24. In FIG. 5, the power control unit 9 is omitted.

In a state where the mount member 21 is fixed to the case 4, as illustrated in FIG. 2, the upper surface 11 of the mounting bracket 10 is disposed at a position lower than the uppermost portion 41 of the case 4. That is, the upper surface of the mount member 21 (horizontal surface 24) is disposed at a position lower than the uppermost portion 41 of the case 4. Then, the power control unit 9 fixed to the mount member 21 is at least partially located above the case 4, a portion is located rearward from the case 4.

Further, the mount member 21, as illustrated in FIG. 4 has a cylindrical portion 26 penetrating in the vehicle width direction. Inside the cylindrical portion 26, as illustrated in FIG. 3, the elastic member 22 is provided.

The elastic member 22 is an elastic member provided between the mount member 21 and the bracket 23. The elastic member 22 is a member capable of elastic deformation, for example, a mount rubber. Inside the elastic member 22, a metal member is provided that extends through the cylindrical portion 26. The metal member extends along the interior of the elastic member 22 in the vehicle width direction. Both end portions in the vehicle width direction of the metal member is attached to the bracket 23 in a state of being exposed from the elastic member 22.

The Bracket 23 is a member which is fixed to the vehicle body 6. In the mount 8, the mount member 21 and the bracket 23 via an elastic member 22 capable of elastic deformation is integrated. The mount member 21 is a fixing member of the case 4 side than the elastic member 22. The bracket 23 is a fixing member of the vehicle body 6 side than the elastic member 22.

In the driving device 1 configured in this way, the weight of the power control unit 9 acts on the case 4 through the mount member 21. That is, since the weight of the power control unit 9 is applied to the power train in the case 4, the effect of lowering the power plant resonance frequency is obtained. Therefore, it is possible to use the rotational speed of the rotating member accommodated in the case 4 to a low region.

Further, even if the fastening point is narrowed by the miniaturization of the case 4 due to the miniaturization of the rotating electric machine 2, by a structure for fixing the power control unit 9 to the mount member 21, the size of the case 4 it is possible to take a wide fastening point regardless.

Further, since the mounting surface of the power control unit 9 is horizontal by the horizontal surface 24, it is possible to mount without considering the posture of the internal components of the power control unit 9.

The power control unit 9 is not limited to the mount 8 is a rear mount, it may be a mount 7 is a front mount. In short, it is sufficient that the power control unit 9 is fixed to the mount member of the case side than the elastic member of the mount, whether the mounting object is a rear mount or a front mount is not particularly limited.

Further, the arrangement of the interior of the case 4 is not particularly limited. The rotating electric machine 2 and the transaxle 3 may be disposed on a separate axis. Further, in the lateral direction of the electric vehicle, the rotating electric machine 2 is the right side, the transaxle may be disposed on the left side.

Further, the case 4 may be any case that houses the rotating electric machine 2, it may not necessarily accommodate the transaxle 3.

In other words, the case 4 is not limited to the transaxle case.

Further, the rotary electric machine 2 may be one that mainly functions as a generator.

For example, the electric vehicle may be a vehicle equipped with a rotating electric machine 2 for power generation and an engine for generating power by the rotating electric machine 2. When the driving device 1 is mounted on the electric vehicle, the power plant resonant frequency is 2 Hz lowered because the weight of the power control unit 9 is applied to the power train. This will 150 rpm expand the range of use for power generation. It can be used up to a 150 rmp lower engine speed.

Further, when there is a change in the platform or a change in the mounting space, when the clearance between the parts is reduced, constraints occur in the storage of the power control unit 9 due to interference with the peripheral components. In the driving device 1, by fixing the power control unit 9 to the mount member 21, it is possible to eliminate the constraints.

Further, the fastening portion between the mounting bracket 10 and the mount member 21 is not particularly limited. By way of example, the mounting bracket 10 may be used to secure the power control unit 9 to the mount member 21 from the top surface (horizontal surface 24) of the mount member 21. As another example, it is possible to fix the mounting bracket 10 from the upper surface and the side surface of the mount member 21.

Of the mount member 21, provided with a bolt hole on the side surface facing the vehicle width direction, by screwing the bolt to the bolt hole, it is possible to fix the mounting bracket 10 from the side surface to the mount member 21.

It is also possible to secure the power control unit 9 to the mount member 21 using the vibration isolating bushing. For example, when securing the power control unit 9 to the mount member 21 using the mounting bracket 10 and the anti-vibration bushing, it is possible to secure the power control unit 9 and the mounting bracket 10 at three or four points by the anti-vibration bushing. Thus, the vibration transmitted between the power control unit 9 and the mount member 21 can be reduced by using the vibration isolating bush.

Further, when fixing the power control unit 9 only with the mounting bracket 10 without using the vibration insulating bush, the through hole provided in the mounting bracket 10 (through hole), and a screw hole provided in the lower portion of PCU case it is possible to fasten by bolting. Thus, it is possible to suppress an increase in the number of parts by not using the vibration insulating bush.

Figure 6:
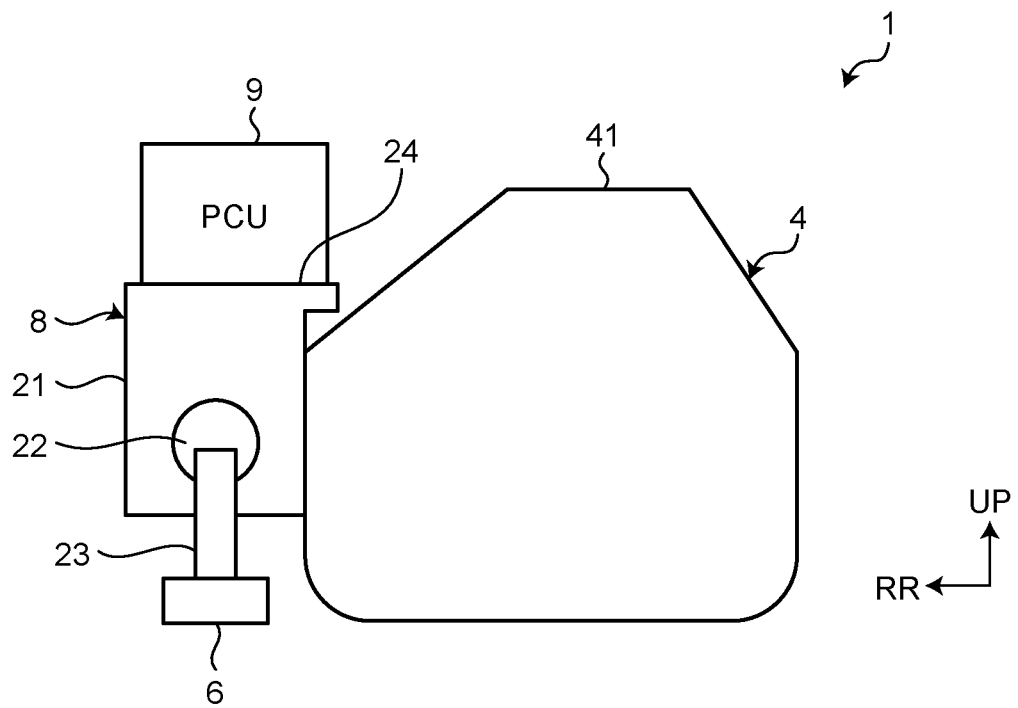
FIG. 6 is a diagram for explaining a configuration in which the power control unit is directly fixed to the mount member.

Further, it is possible to fix the power control unit 9 directly to the mount member 21 without using the mounting bracket 10. As illustrated in FIG. 6, the power control unit 9 includes a mount member 21.

Figure 7:
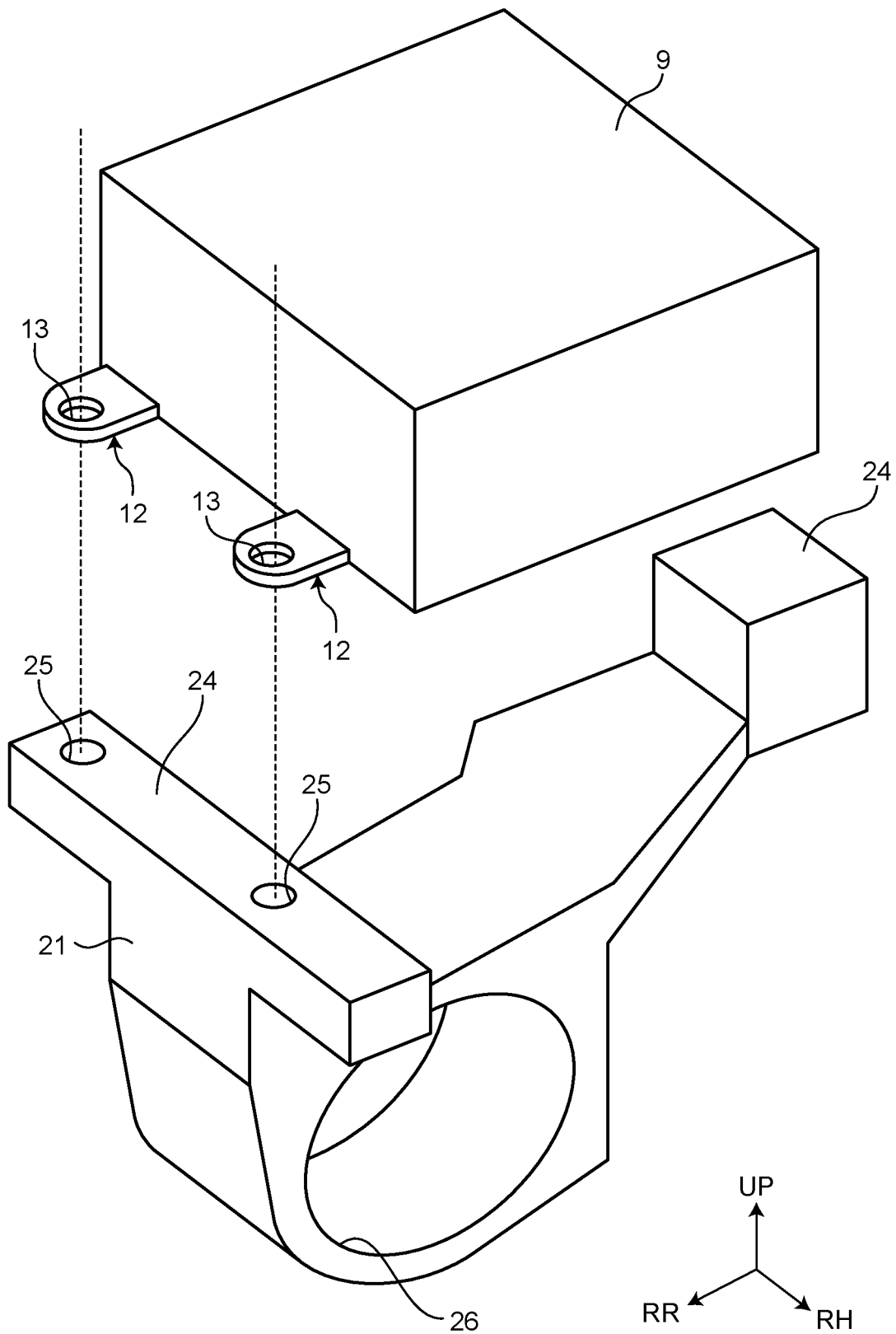
FIG. 7 is a diagram for explaining a method of fastening the power control unit and the mount member.

It is mounted on the horizontal surface 24. The horizontal surface 24 is disposed at a position lower than the top 41 of the case 4. As illustrated in FIG. 7, the power control unit 9 includes a connection portion 12 is a portion to be fastened to the horizontal surface 24. The connecting portion 12 has a through hole 13 through which the bolt is inserted. The horizontal surface 24, a bolt hole 25 bolt is screwed at a position corresponding to the through hole 13 is provided. For example, the flange provided on the lower surface of the case of the power control unit 9 as the connecting portion 12, it is possible to form a through hole (through hole 13) in the flange. Thus, it is possible to suppress an increase in the number of parts by not using the mounting bracket 10.

According to the present disclosure, it is possible to mount the power control unit on the horizontal surface of the mount member, it is possible to integrate the power control unit in the case without considering the posture of the internal components.

According to an embodiment, it is possible to mount the power control unit on the horizontal surface of the mount member, it is possible to integrate the power control unit in the case without considering the posture of the internal components. According to an embodiment, it is possible to suppress the height when mounting the power control unit.

According to an embodiment, it is possible to fix the power control unit to the mount member using the mounting bracket.

According to an embodiment, it is possible to suppress the height of the power control unit mounted on the mount member through the mounting bracket.

According to an embodiment, since the power control unit is directly fixed to the mount member without using the mounting bracket, it is possible to suppress an increase in the number of parts.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle drive apparatus comprising:
   a case accommodating a rotating electric machine;
   a mount supporting the case to a vehicle body; and
   a power control unit controlling the rotary electric machine, wherein
   the mount includes a bracket which is fixed to the vehicle body, a mount member which is fixed to the case, and an elastic member provided between the bracket and the mount member,
   the power control unit is fixed to the mount member,
   the mount member has a horizontal surface on a top thereof as a mounting surface on which the power control unit is attached, and
   the power control unit and the case are integrated via the mount member.

2. The vehicle drive apparatus according to claim 1, wherein
   the horizontal surface is provided at a position lower than an uppermost portion of the case in a vertical direction of the vehicle, and
   at least a part of the power control unit is disposed above the case.

3. The vehicle drive apparatus according to claim 2, further comprising: a mounting bracket interposed between the power control unit and the mount member, wherein the mounting bracket has an upper surface in contact with the power control unit and a bottom surface in contact with the horizontal surface.

4. The vehicle drive apparatus according to claim 3, wherein an upper surface of the mounting bracket is provided at a position lower than the uppermost portion of the case in the vertical direction of the vehicle.

5. The vehicle drive apparatus according to claim 2, wherein the power control unit has a through hole through which a bolt is inserted to be fastened to the horizontal surface, and the horizontal surface has a bolt hole into which the bolt is screwed at a position corresponding to the through hole.

\* \* \* \* \*